United States Patent [19]

Lee

[11] 4,438,232

[45] Mar. 20, 1984

[54] CARBOXYLATED ACRYLATE STYRENE BUTADIENE ADHESIVES

[75] Inventor: Ivan S. Lee, Brights Grove, Canada

[73] Assignee: Polysar Limited, Ontario, Canada

[21] Appl. No.: 406,888

[22] Filed: Aug. 10, 1982

[51] Int. Cl.$^3$ .................. C08L 93/00; C08L 9/08
[52] U.S. Cl. .................. 524/272; 524/273; 524/501; 524/502; 524/505; 524/551; 524/556; 524/562; 525/214; 525/221; 526/296; 526/317
[58] Field of Search ............. 526/296, 317; 524/272, 524/273, 551, 556, 562, 501, 502, 505; 525/214, 221

[56] References Cited

U.S. PATENT DOCUMENTS

| | | | |
|---|---|---|---|
| 3,554,940 | 1/1971 | Arakawa et al. | 524/273 |
| 3,838,079 | 9/1974 | Kosaka et al. | 524/272 |
| 3,970,623 | 7/1976 | Feeney et al. | 524/272 |
| 4,013,824 | 3/1977 | Uraneck et al. | 526/205 |
| 4,061,833 | 12/1977 | Pelletter et al. | 524/556 |
| 4,064,092 | 12/1977 | Burroway et al. | 526/317 |
| 4,064,337 | 12/1977 | Uraneck et al. | 526/221 |
| 4,189,419 | 2/1980 | Takemoto et al. | 524/272 |
| 4,189,561 | 2/1980 | Burroway et al. | 526/317 |
| 4,268,546 | 5/1981 | Schwartz et al. | 524/562 |

FOREIGN PATENT DOCUMENTS 720858 11/1965 Canada .
12032 6/1980 European Pat. Off. .

Primary Examiner—H. S. Cockeram
Attorney, Agent, or Firm—Stevens, Davis, Miller & Mosher

[57] ABSTRACT

An adhesive composition having improved properties for pressure sensitive adhesive applications has been developed comprising a latex of a polymer formed by polymerizing 40-10 percent vinyl or vinylidene monoaromatic monomer, 45-70 percent $C_{4-6}$ cojugated diene, 1-5 percent unsaturated acid, and 5-30 percent $C_{1-8}$ alkyl ester of acrylic or methacrylic acid. The adhesive preferably also contains a tackifier resin. The adhesive is useful on a number of applications including the manufacture of labels and tapes.

15 Claims, No Drawings

CARBOXYLATED ACRYLATE STYRENE BUTADIENE ADHESIVES

Pressure sensitive adhesives have a wide range of applications in industrial societies from price labels to automotive applications. In the past, pressure sensitive adhesives have utilized a hydrocarbon solvent or diluent as a carrier. The adhesives usually comprise a synthetic resin as a binder and a synthetic or natural resin as a tackifier. The resins are generally compatible in a hydrocarbon solvent or diluent. It was relatively simple to adjust the physical properties of the adhesive by changing the relative ratio of binder and tackifier.

Due to rising costs and environmental concerns there has been a growing demand for aqueous based pressure sensitive adhesives. A carboxylated styrene-butadiene polymer latex binder has been developed having a polymer with a molecular weight distribution so that from about 20 to about 45 percent of the polymer has a weight average molecular weight of from about 3,500 to about 50,000. In addition, 20 to 70 weight percent of the polymer is present in a crosslinked form which is not soluble in tetrahydrofuran or toluene. This polymer latex when used in combination with a tackifier resin produces a pressure sensitive adhesive compound with high cohesive strength and with satisfactory initial tack or specific adhesion. However, there exists a demand for pressure sensitive adhesives having a higher specific adhesion. Additionally, the incorporation of the tackifier into the adhesive composition is frequently a difficult and/or time consuming process, usually involving physically blending an aqueous dispersion of the tackifier with the latex. In many cases the tackifier is not available commercially as an aqueous dispersion, thereby requiring a further time consuming step for the preparation of the dispersion. There exists a need, therefore, for an aqueous based pressure sensitive adhesive composition with high cohesive strength and high specific adhesion which does not necessarily require the addition of a tackifier dispersion. Such an adhesive composition has been developed comprising the latex of a carboxylated styrene-butadiene polymer which polymer contains a $C_{1-8}$ alkyl ester of acrylic or methacrylic acid as an additional monomer.

There is little art relating to these tetrapolymers and their use in pressure sensitive adhesive applications.

The most relevant art is U.S. Pat. No. 4,268,546, issued May 19, 1981, in the names of James E. Schwartz and Kent B. McReynolds, assigned to the Dow Chemical Company. This patent discloses a latex polymer binder for non-woven material prepared from synthetic fibers. The polymer in the latex comprises from 35 to 60 weight percent of a monomer such as styrene, from 0 to 45 weight percent of butadiene or isoprene, from 10 to 50 weight percent of a $C_{1-8}$ alkyl acrylate, and from 1 to 5 weight percent of an ethylenically unsaturated mono- or di-carboxylic acid. The polymeric portion of the latex of the present invention contains a higher conjugated diene portion, a lower amount of styrene-type monomer. Furthermore, there is a significant difference in applications between non-woven materials and pressure sensitive adhesives.

Japanese Kokai No. 77/130,840, published Nov. 2, 1977, discloses a very specific tri-polymer useful in adhesive applications. The polymer comprises 5 to 100 percent butadiene, 95 to 0 percent of a vinyl monomer and 5 to 50 percent of 2,2,4-trimethyl-1,3-pentandiol monoisobutyrate.

Japanese Kokai Tokkyo Koho No. 80/44,273 discloses a polymer useful for providing a blister resistant and alkali resistant coating to cement pipes. The polymer comprises 40 to 80 percent aromatic vinyl compound and/or alkyl methacrylate, 5–40 percent butadiene, 10–50 percent of an ester of an unsaturated acid, and 1–10 percent of an unsaturated acid. The polymer of the present application is distinct over this Japanese art in that the Japanese art uses a lower level of butadiene. The use of the polymer as a blister and chemical resistant coating does not suggest suitability as a component in a pressure sensitive adhesive.

The present invention provides a novel aqueous based pressure sensitive adhesive composition having a good balance of adhesive and cohesive properties.

The present invention provides a pressure sensitive adhesive composition comprising the latex of a polymer formed by polymerizing:
 (a) from about 40 to about 10 weight percent of a vinyl or vinylidene monoaromatic monomer which may be unsubstituted or substituted by a $C_{1-4}$ alkyl radical or a chlorine or bromine atom;
 (b) from about 45 to about 70 weight percent of a $C_{4-6}$ conjugated diene;
 (c) from about 1 to about 5 weight percent of a $C_{3-6}$ ethylenically unsaturated mono- or di-carboxylic acid or a mixture thereof; and
 (d) from about 5 to about 30 weight percent of a $C_{1-8}$ alkyl ester of acrylic or methacrylic acid;
wherein the total of (a), (b), (c) and (d) is 100 weight percent.

The adhesive composition may additionally comprise, per 100 parts by dry weight of said polymer, from about 25 to about 100 parts by weight of a tackifier selected from the group:
 (e) a rosin or a hydrogenated rosin ester which has a ring and ball softening temperature from about 75° to about 100° C.;
 (f) a synthetic hydrocarbon tackifier resin having a ring and ball softening temperature from about 10° to about 95° C. manufactured from a $C_9$ aromatic monomer of a $C_5$ aliphatic monomer; and
 (g) an acrylic resin selected from polymers of one or more of acrylic acid which is unsubstituted or substituted by a $C_{1-4}$ alkyl or alkoxy radical, or $C_{1-6}$ alkyl esters thereof.

The present invention also provides a substrate coated with from about 15 to about 60 g/cm$^2$ of a pressure sensitive adhesive composition comprising a polymer formed by polymerizing:
 (a) from about 40 to about 10 weight percent of a vinyl or vinylidene monoaromatic monomer which may be unsubstituted or substituted by a $C_{1-4}$ alkyl radical or a chlorine or bromine atom;
 (b) from about 45 to about 70 weight percent of a $C_{4-6}$ conjugated diene;
 (c) from about 1 to about 5 weight percent of a $C_{3-6}$ ethylenically unsaturated mono- or di-carboxylic acid or a mixture thereof; and
 (d) from about 5 to about 30 weight percent of a $C_{1-8}$ alkyl ester of acrylic or methacrylic acid;
wherein the total of (a), (b), (c) and (d) is 100 weight percent.

The adhesive composition coated on the substrate may additionally comprise, per 100 parts by weight of said polymer, from about 25 to about 100 parts by weight of a tackifier selected from the group;
  (e) a rosin or a hydrogenated rosin ester which has a ring and ball softening temperature from about 75° to about 100° C.;
  (f) a synthetic hydrocarbon tackifier resin having a ring and ball softening temperature from about 10° to about 95° C. manufactured from a $C_9$ aromatic monomer or a $C_5$ aliphatic monomer; and
  (g) an acrylic resin selected from polymers of one or more of acrylic acid which is unsubstituted or substituted by a $C_{1-4}$ alkyl or alkoxy radical, or $C_{1-6}$ alkyl esters thereof.

In making the polymer in accordance with the present invention, the amount of vinyl or vinylidene monoaromatic monomer which is used is from about 10 to about 40 weight percent based on the total monomer. Preferably this monomer is used in an amount from about 15 to about 30 weight percent and most preferably from about 19 to about 23 weight percent. Suitable monomers include styrene which is unsubstituted or substituted by a $C_{1-4}$ alkyl radical or a chlorine or bromine atom. Typical monomers include sytrene, α-methyl styrene, and chlorostyrene.

The $C_{4-6}$ conjugated diene is used in an amount from about 45 to about 70 weight percent based on total monomer. Preferably, the conjugated diene is used in an amount from about 55 to about 70 weight percent and most preferably from about 54 to about 58 weight percent. Useful aliphatic $C_{4-6}$ conjugated dienes are well known to those skilled in the art and include monomers such as 1,3 butadiene and isoprene. Butadiene is preferred.

The mono- or di-carboxylic acid is used in an amount from about 1 to about 5 weight percent based on the total monomer. The preferred amount is from about 2 to about 4 weight percent. Useful acids contain from about 3 to 6 carbon atoms and include maleic, fumaric, itaconic, butenoic, pentenoic, hexenoic, acrylic and methacrylic acid. Mixtures of one or more of these acids may also be used.

The alkyl ester is used in an amount from about 5 to about 30 weight percent based on the weight of the total monomer. Preferably the ester is used in an amount from about 18 to about 22 percent by weight. The $C_{1-8}$ alkyl ester of acrylic acid or methacrylic acid may be a simple straight chain ester such as butyl acrylate or a branched ester such as ethyl hexyl acrylate. The ester may be a methyl, ethyl, propyl, isopropyl, butyl, isobutyl, tertiary butyl, pentyl, hexyl, freptyl or octyl ester of acrylic or methacrylic acid.

The latex of the present invention may be prepared by well-known conventional emulsion polymerization techniques using the monomers herein disclosed and conventional additives for emulsion polymerization. The emulsifiers may be either anionic or non-ionic. Conventional initiators or initiator systems of either the redox or the free radical type may be used to start the polymerization. Electrolytes and chelating agents may be used in accordance with known emulsion polymerization art.

The balance between the adhesives and cohesive properties of the polymer may be changed by adjusting the molecular weight distribution of the polymer. A useful molecular weight distribution arises when from about 20 to about 45 weight percent of the polymer has a weight average molecular weight from about 3,500 to about 50,000. Modifiers and methods useful for achieving this molecular weight distribution include those disclosed in U.S. Pat. Nos. 4,013,824 and 4,064,337, issued Mar. 22, 1977 and Dec. 20, 1977, to Carl Uraneck and John E. Burleigh, assigned to Phillips Petroleum, the disclosures of which are herein incorporated by reference. The physical characteristics of such polymers are discussed in applicants co-pending U.S. application Ser. No. 357,093, filed Mar. 11, 1982 in the name of Ivan Sou-Phong Lee.

When a tackifier is used in the adhesive composition of the present invention, it is present in amounts from about 25 to about 100 parts by weight per 100 parts by dry weight of polymer in the latex. Preferably the amount of tackifier is from about 25 to about 50 parts by weight per 100 parts by dry weight of polymer in the latex.

The latex and the tackifier are blended using conventional blenders to provide a homogeneous mixture. Preferably, the tackifier is added as an aqueous dispersion. The tackifier may be a natural or a synthetic tackifier resin. The tackifier may be a rosin or a hydrogenated rosin ester which has a ring and ball softening temperature from about 75° to about 100° C. Examples of such esters which are suitable for use in the present invention include those sold under the trade names Stabelite ester 10, Pentalyn H and Floral 85 by Hercules Inc. The tackifier also may be a synthetic hydrocarbon tackifier resin manufactured from a $C_9$ aromatic monomer which may be for example indene or α-methyl styrene or mixtures thereof or from a $C_5$ aliphatic monomer such as for example piperylene or cyclopentadiene or mixtures thereof. Examples of such resins which are suitable include those sold under the tradenames Piccovar AP-25, Hercotac 4085, Picconal A501 and Piccolyte 110M by Hercules, Inc. and Escorez 2101 by Exxon Chemical. These synthetic hydrocarbon tackifier resins should have a ring and ball softening temperature from about 10° to about 95° C. The tackifier may also be an acrylic resin such as that sold under the trade name Rhoplex N619 by Rohm and Haas Co.

The adhesive compositions of the present invention may be applied to conventional substrates. The substrate may be a non-woven cellulosic material for use as price labels, or product labels or masking tape. The substrate may be a polymeric material such as a polyolefin which is used to manufacture adhesive tapes.

The substrate is usually relatively thin material, usually no greater than about 3 mm in thickness. However, the present invention contemplates that the adhesives could be used on other types of substrates. In the manufacture of tapes and labels the substrate is a relatively thin sheet material. The sheet material may be a polymeric material which is flexible at about room temperature. The sheet material may be a homopolymer of an ethylenically unsaturated monomer such as ethylene, propylene or vinyl chloride, provided the substrate has sufficient flexibility for the desired end use. The substrate may also be a copolymer containing an ethylenically unsaturated monomer such as ethylene, propylene, vinyl chloride, a saturated or unsaturated mono- or di-carboxylic acid monomer such as maleic acid, fumaric acid, acrylic acid, methacrylic acid, adipic, propenoic, butenoic, and pentoic acids, an alcohol monomer, such as $C_9$–$C_{15}$ alcohols, or an amide monomer having about 4–10 carbon atoms. Thus, the sheet material may be polyester or a polyamide. The substrate may be made from cellulosic or reconstituted cellulosic material such as rayon. The substrate need not be a sheet material but may be composed of fibers which may be woven, or non-woven as is the case is paper. The woven substrate may be made from cellulosic material, such as cotton or from fibers of any of the above mentioned polymers.

The composition is applied to the substrate using conventional coating techniques such as roller coaters, blade coaters, meyer rods or air coaters. The coated substrate is then dried usually by passing it through a heating tunnel or oven which may use circulating hot air or infrared lamps to dry the coated substrate. The drying time will be a function of a number of factors such as the heat capacity of the substrate, the type of heating, the oven temperature, air velocities (if circulating air is used) and the rate of passage of the substrate through the oven or heating tunnel. The manufacturer may readily determine suitable time/temperature relationships to determine optimum drying conditions in his equipment for the product.

The substrate should be coated with sufficient composition to provide a dry coat weight from about 16 to about 60 g/m². Generally, in the manufacture of tapes using a continuous sheet polymeric substrate a dry coat weight of about 25–30 g/m² is used. In the manufacture of labels a dry coating weight from about 20–30 g/m² is usually used. In the manufacture of masking tape, a dry coating weight from about 40–60 g/m² is usually used.

After drying, the coated substrate is cut to the required dimension. In the manufacture of tape, the substrate is cut into strips and rolled to provide a finished product. The substrate may also be cut into shaped items to provide labels or medicinal tapes. These processes are known to those in the tape industry.

Without wishing to limit the scope of the disclosure, the following examples illustrate some aspects of the present invention.

A series of 4 experimental latexes was prepared using conventional emulsion polymerization techniques. Latices $E_1$ and $E_2$ are comparative and contain no ester monomer while latices $E_3$ and $E_4$ are in accordance with the present invention. The monomers charged for each latex are shown in Table 1 in parts by weight.

TABLE 1

| Monomer | $E_1$ | $E_2$ | $E_3$ | $E_4$ |
|---|---|---|---|---|
| Styrene | 25 | 30 | 25 | 21 |
| Butadiene | 72 | 67 | 67 | 56 |
| Butyl acrylate | 0 | 0 | 5 | 20 |
| Carboxylic acid | 3 | 3 | 3 | 3 |

In each case the monomers were polymerized in the presence of mercaptan using conventional hot polymerization techniques for a period of 10 hours to a conversion of about 90 to 95 percent.

As a further comparative example, a commercially available carboxylated styrene-butadiene latex with a 42 percent bound styrene content was also used. This latex is sold under the trade name POLYSAR latex 222 by Polysar Limited.

Each of the latices was used alone and in blends with tackifiers as shown in Table 4 as pressure sensitive adhesive compositions. When tackifiers were used, they were blended in the form of aqueous dispersions into the latex using a conventional blender. Sufficient water was added to each composition to provide a total solids content of 50 percent by weight. An acrylic thickening agent, sold under the trade name Acrysol GS by Rohm and Haas Company, was then added in an amount sufficient to adjust the viscosity of each composition to 1,000 cP as measured on a Brookfield LVT viscometer using a No. 3 spindle at 30 rpm and at 25° C.

The resulting compositions were then applied to a 0.025 mm film, sold under the trade name Mylar, to provide a dry coat weight of from 26 to 28 g/m². The coated film was then dried in an oven for about 2.5 minutes at 115°±5° C. The resulting products were tested using Pressure Sensitive Tape Council (PSTC) or American Society for Testing and Materials (ASTM) test methods as indicated in Table 4.

TABLE 4

| INGREDIENT (parts by dry weight) | | | | | | | | |
|---|---|---|---|---|---|---|---|---|
| POLYSAR latex 222 | 100 | 100 | 100 | 100 | 100 | 100 | 100 | 100 |
| Piccovar AP-25 Dispersion | — | 25 | 50 | — | — | — | — | — |
| Staybelite Ester-10 Dispersion | — | — | — | 25 | 50 | — | — | — |
| Escorez 2101 Dispersion | — | — | — | — | — | 25 | 50 | 100 |
| PRESSURE SENSITIVE ADHESIVE PROPERTIES | | | | | | | | |
| 180° PEEL ADHESION (PSTC-1), g/cm | | | | | | | | |
| Dwell Time 10 sec. | 358 | 512 | 472 | 426 | 545 | 367 | 448 | 475 |
| Dwell Time 5 min. | 398 | 551 | 613 | 475 | 576 | 417 | 481 | 554 |
| 90° QUICK STICK (PSTC-5), g/cm | 120 | 200 | 276 | 225 | 323 | 154 | 164 | 99 |
| 2° STATIC SHEAR (PSTC-7), hr | | | | | | | | |
| 1" × ½"/1 kg/25° C. | >48 | >48 | 28.5 | >48 | >48 | >48 | >48 | >48 |
| 1" × 1"/1 kg/66° | >24 | >24 | >24 | >24 | >24 | >24 | >24 | 1.7 |
| DYNAMIC TACK (PSTC-6), cm | >15 | 5.7 | 4.2 | 10.5 | >15 | >15 | >15 | >15 |
| PROBE TACK (ASTM-D2979), g/cm² | 503 | 708 | 785 | 861 | 888 | 630 | 737 | 660 |
| ADHESIVE FAILURE, Adhesive/Cohesive | A | A | C | A | A | A | A | A |
| *CARDBOARD FIBER TEAR TEST | P | G | G | F | F | G | G | P |
| **90° PEELABILITY FROM POLYPROPYLENE, g/cm | 94 | 244 | 300 | 182 | 252 | 65 | 53 | 99 |
| APPEARANCE | CLEAR | | | | | | | |
| INGREDIENT (parts by dry weight) | | | | | | | | |
| LATEX $E_1$ | 100 | 100 | 100 | 100 | 100 | 100 | 100 | 100 |
| Piccovar AP-25 Dispersion | — | 25 | 50 | — | — | — | — | — |
| Staybelite Ester-10 Dispersion | — | — | — | 25 | 50 | — | — | — |
| Escorez 2101 Dispersion | — | — | — | — | — | 50 | 75 | 100 |
| PRESSURE SENSITIVE ADHESIVE PROPERTIES | | | | | | | | |
| 180° PEEL ADHESION (PSTC-1), g/cm | | | | | | | | |
| Dwell Time 10 sec. | 518 | 424 | 397 | 603 | 706 | 817 | 933 | 1,045 |
| Dwell Time 5 min. | 537 | 473 | 456 | 600 | 735 | 820 | 966 | 1,039 |
| 90° QUICK STICK (PSTC-5), g/cm | 259 | 333 | 260 | 342 | 403 | 343 | 360 | 323 |
| 2° STATIC SHEAR (PSTC-7), hr | | | | | | | | |
| 1" × ½"/1 kg/25° C. | >48 | >48 | >48 | >48 | >48 | >48 | >48 | 3.0 |

TABLE 4-continued

| | | | | | | | | |
|---|---|---|---|---|---|---|---|---|
| 1" × 1"/1 kg/66° | >24 | >24 | >24 | >24 | 7.2 | >24 | >24 | 1.5 |
| DYNAMIC TACK (PSTC-6), cm | 8.0 | 0.5 | 0.0 | 0.8 | 0.8 | 4.0 | 6.0 | 8 |
| PROBE TACK (ASTM-D2979), g/cm$^2$ | 752 | 640 | 651 | 857 | 906 | 873 | 927 | 962 |
| ADHESIVE FAILURE, Adhesive/Cohesive | A | A | C | A | C | C | C | C |
| *CARDBOARD FIBER TEAR TEST | P | G | G-E | G | G | E | E | E |
| **90° PEELABILITY FROM POLYPROPYLENE, g/cm | 204 | 211 | 226 | 288 | 327 | 227 | 294 | 235 |
| APPEARANCE | CLEAR | | | | | | | |

| INGREDIENT (parts by dry weight) | | | | | | |
|---|---|---|---|---|---|---|
| LATEX E$_2$ | 100 | 100 | 100 | 100 | 100 | 100 |
| Piccovar AP-25 Dispersion | — | 25 | 50 | — | — | — |
| Staybelite Ester-10 Dispersion | — | — | — | 25 | 50 | — |
| Escorez 2101 Dispersion | — | — | — | — | — | 50 |
| PRESSURE SENSITIVE ADHESIVE PROPERTIES | | | | | | |
| 180° PEEL ADHESION (PSTC-1), g/cm | | | | | | |
| Dwell Time 10 sec. | 480 | 421 | 339 | 553 | 599 | 597 |
| Dwell Time 5 min. | 559 | 492 | 388 | 652 | 711 | 601 |
| 90° QUICK STICK (PSTC-5), g/cm | 272 | 291 | 249 | 340 | 340 | 318 |
| 2° STATIC SHEAR (PSTC-7), hr | | | | | | |
| 1" × ¼"/1 kg/25° C. | >48 | >48 | >48 | >48 | >48 | >48 |
| 1" × 1"/1 kg/66° | >24 | >24 | >24 | >24 | >24 | >24 |
| DYNAMIC TACK (PSTC-6), cm | 10.0 | 1.0 | 0.5 | 2.0 | 1.5 | 9.0 |
| PROBE TACK (ASTM-D2979), g/cm$^2$ | 723 | 752 | 743 | 888 | 952 | 865 |
| ADHESIVE FAILURE, Adhesive/Cohesive | A | A | A | A | A | A |
| *CARDBOARD FIBER TEAR TEST | P | F | G | F-G | F-G | G |
| **90° PEELABILITY FROM POLYPROPYLENE, g/cm | 207 | 168 | 188 | 280 | 326 | 184 |
| APPEARANCE | CLEAR | | | | | |

| INGREDIENT (parts by dry weight) | | | | |
|---|---|---|---|---|
| LATEX E$_3$ | 100 | 100 | 100 | 100 |
| Piccovar AP-25 Dispersion | — | — | — | 25 |
| Staybelite Ester-10 Dispersion | — | 25 | — | — |
| Escorez 2101 Dispersion | — | — | 50 | — |
| PRESSURE SENSITIVE ADHESIVE PROPERTIES | | | | |
| 180° PEEL ADHESION (PSTC-1), g/cm | | | | |
| Dwell Time 10 sec. | 498 | 700 | 888 | 388 |
| Dwell Time 5 min. | 593 | 618 | 826 | 464 |
| 90° QUICK STICK (PSTC-5), g/cm | 218 | 342 | 329 | 257 |
| 2° STATIC SHEAR (PSTC-7), hr | | | | |
| 1" × ¼"/1 kg/25° C. | >48 | >48 | >48 | >48 |
| 1" × 1"/1 kg/66° | >24 | >24 | >24 | >24 |
| DYNAMIC TACK (PSTC-6), cm | 6.0 | 1.5 | 6.5 | 1.5 |
| PROBE TACK (ASTM-D2979), g/cm$^2$ | 850 | 860 | 950 | 750 |
| ADHESIVE FAILURE, Adhesive/Cohesive | A | A/C | A/C | A |
| *CARDBOARD FIBER TEAR TEST | G | G-E | E | G-E |
| **90° PEELABILITY FROM POLYPROPYLENE, g/cm | 105 | 278 | 120 | 206 |
| APPEARANCE | CLEAR | | | |

| INGREDIENT (parts by dry weight) | | | | | | |
|---|---|---|---|---|---|---|
| LATEX E$_4$ | 100 | 100 | 100 | 100 | 100 | 100 |
| Piccovar AP-25 Dispersion | — | 25 | 50 | — | — | — |
| Staybelite Ester-10 Dispersion | — | — | — | — | — | — |
| Escorez 2101 Dispersion | — | — | — | — | — | 50 |
| PRESSURE SENSITIVE ADHESIVE PROPERTIES | | | | | | |
| 180° PEEL ADHESION (PSTC-1), g/cm | | | | | | |
| Dwell Time 10 sec. | 479 | 388 | 353 | 566 | 776 | 494 |
| Dwell Time 5 min. | 462 | 418 | 331 | 352 | 730 | 656 |
| 90° QUICK STICK (PSTC-5), g/cm | 286 | 281 | 181 | 310 | 317 | 320 |
| 2° STATIC SHEAR (PSTC-7), hr | | | | | | |
| 1" × ¼"/1 kg/25° C. | >48 | >48 | >48 | >48 | >48 | >48 |
| 1" × 1"/1 kg/66° | >24 | >24 | >22.9 | >24 | 2.8 | >24 |
| DYNAMIC TACK (PSTC-6), cm | 3.5 | 0.5 | 0 | 1.0 | 1.5 | 8.5 |
| PROBE TACK (ASTM-D2979), g/cm$^2$ | 780 | 817 | 836 | 897 | 1,056 | 900 |
| ADHESIVE FAILURE, Adhesive/Cohesive | A | A | A | A | C | A |
| *CARDBOARD FIBER TEAR TEST | G-E | E | E | E | E | E |
| **90° PEELABILITY FROM POLYPROPYLENE, g/cm | 187 | 181 | 158 | 194 | 288 | 426 |
| APPEARANCE | CLEAR | | | | | |

*Using Domtar corrugated board (C-6) with minimum combined weight facings of 660 g/m$^2$, tested by placing tape on cardboard and rolling twice with 2 kg rubber-covered roller and immediately peeling at 90° from substrate.
**Tested by placing tape on untreated polyproylene surface and rolling twice with 2 kg rubber-covered roller, and subsequently peeling at 90° from surface after one minute dwell time.
A — Adhevise;
C — Cohesive;
P — Poor;
F — Fair,
G — Good;
E — Excellent.

What is claimed is:

A pressure sensitive adhesive composition comprising the latex of a polymer formed by polymerizing (a) from about 40 to about 10 weight percent of a vinyl or vinylidene monoaromatic monomer which may be unsubstituted or substituted by a $C_{1-4}$ alkyl radical or a chlorine or bromine atom;

(b) from about 45 to about 70 weight percent of a $C_{4-6}$ conjugated diene;

(c) from about 1 to about 5 weight percent of a $C_{3-6}$ ethylenically unsaturated mono- or di-carboxylic acid or a mixture thereof; and (d) from about 5 to about 30 weight percent of a $C_{1-8}$ alkyl ester of acrylic or methacrylic acid; wherein the total of (a), (b), (c) and (d) is 100 weight percent.

2. The composition according to claim 1 which additionally comprises, per 100 parts by dry weight of said polymer, from about 25 to about 100 parts by weight of a tackifier selected from the group:

(e) a rosin or a hydrogenated rosin ester which has a ring and ball softening temperature from about 75° to about 100° C.;

(f) a synthetic hydrocarbon tackifier resin having a ring and ball softening temperature from about 10° to about 95° C. manufactured from a $C_9$ aromatic monomer or a $C_5$ aliphatic monomer; and (g) an acrylic resin selected from polymers of one or more of acrylic acid which is unsubstituted or substituted by a $C_{1-4}$ alkyl or alkoxy radical, or $C_{1-6}$ alkyl esters thereof.

3. The composition according to claim 1 wherein the amount of (a) is from about 19 to about 23 weight percent.

4. The composition according to claim 3 wherein the amount of (b) is from about 54 to about 58 weight percent.

5. The composition according to claim 4 wherein the amount of (c) is from about 2 to about 4 weight percent.

6. The composition according to claim 5 wherein the amount of (d) is from about 18 to about 22 weight percent.

7. The composition according to claim 6 which additionally comprises, per 100 parts by dry weight of said polymer, from about 25 to about 100 parts by weight of a tackifier selected from the group:

(e) a rosin or a hydrogenated rosin ester which has a ring and ball softening temperature from about 75° to about 100° C.;

(f) a synthetic hydrocarbon tackifier resin having a ring and ball softening temperature from about 10° to about 95° C. manufactured from a $C_9$ aromatic monomer or a $C_5$ aliphatic monomer; and (g) an acrylic resin selected from polymers of one or more of acrylic acid which is unsubstituted or substituted by a $C_{1-4}$ alkyl or alkoxy radical, or $C_{1-6}$ alkyl esters thereof.

8. The composition according to claim 2 wherein said polymer has a weight average molecular weight distribution so that from about 20 to about 45 weight percent of said polymer has a molecular weight of from about 3,500 to about 50,000, and the amount of tackifier is from about 25 to about 50 parts by weight.

9. The composition according to claim 7 wherein said polymer has a weight average molecular weight distribution so that from about 20 to about 45 weight percent of said polymer has a molecular weight of from about 3,500 to about 50,000, and the amount of tackifier is from about 25 to about 50 parts by weight.

10. A composition according to claim 1 or 2 wherein said polymer has a weight average molecular weight distribution so that from about 20 to about 45 weight percent of said polymer has a molecular weight of from about 3,500 to about 50,000.

11. The composition according to claims 2, 8 or 9 wherein the tackifier is selected from (e).

12. The composition according to claims 2, 8 or 9 wherein the tackifier is selected from (f).

13. A substrate coated with from about 15 to about 60 $g/m^2$ of a pressure sensitive adhesive composition comprising a polymer formed by polymerizing:

(a) from about 40 to about 10 weight percent of a vinyl or vinylidene monoaromatic monomer which may be unsubstituted or substituted by a $C_{1-4}$ alkyl radical or a chlorine or bromine atom;

(b) from about 45 to about 70 weight percent of a $C_{4-6}$ conjugated diene;

(c) from about 1 to about 5 weight percent of a $C_{3-6}$ ethylenically unsaturated mono- or di-carboxylic acid or a mixture thereof; and (d) from about 5 to about 30 weight percent of a $C_{1-8}$ alkyl ester of acrylic or methacrylic acid; wherein the total of (a), (b), (c) and (d) is 100 weight percent.

14. The substrate according to claim 12 wherein the adhesive composition additionally comprises, per 100 parts by dry weight of said polymer, from about 25 to about 100 parts by weight of a tackifier selected from the group:

(e) a rosin or a hydrogenated rosin ester which has a ring and ball softening temperature from about 75° to about 100° C.;

(f) a synthetic hydrocarbon tackifier resin having a ring and ball softening temperature from about 10° to about 95° C. manufactured from a $C_9$ aromatic monomer or a $C_5$ aliphatic monomer; and (g) an acrylic resin selected from polymers of one or more of acrylic acid which is unsubstituted or substituted by a $C_{1-4}$ alkyl or alkoxy radical, or $C_{1-6}$ alkyl esters thereof.

15. A substrate according to claim 12 or 13 wherein said polymer has a weight average molecular weight distribution so that from about 20 to about 45 weight percent of said polymer has a molecular weight of from about 3,500 to about 50,000.

* * * * *